United States Patent
Guo

(10) Patent No.: US 11,204,086 B2
(45) Date of Patent: Dec. 21, 2021

(54) DIFFERENTIAL LOCKING MECHANISM

(71) Applicant: Fang Guo, Jining (CN)

(72) Inventor: Fang Guo, Jining (CN)

( * ) Notice: Subject to any disclaimer, the term of this patent is extended or adjusted under 35 U.S.C. 154(b) by 0 days.

(21) Appl. No.: 17/037,622

(22) Filed: Sep. 29, 2020

(65) Prior Publication Data

US 2021/0010579 A1 Jan. 14, 2021

Related U.S. Application Data

(63) Continuation of application No. PCT/CN2019/091975, filed on Jun. 20, 2019.

(30) Foreign Application Priority Data

Sep. 4, 2018 (CN) .......................... 201811022133.3

(51) Int. Cl.
*F16H 48/24* (2006.01)
*F16H 48/08* (2006.01)
*F16H 48/22* (2006.01)
*F16H 48/36* (2012.01)

(52) U.S. Cl.
CPC ............. *F16H 48/24* (2013.01); *F16H 48/08* (2013.01); *F16H 48/22* (2013.01); *F16H 2048/366* (2013.01)

(58) Field of Classification Search
CPC .... F16H 48/08–2048/087; F16H 48/24; F16H 48/22; F16H 2048/366–368
See application file for complete search history.

(56) References Cited

U.S. PATENT DOCUMENTS 2,132,692 A * 10/1938 Lawrence ............. F16H 48/295
475/233
4,715,248 A * 12/1987 Gant ....................... F16H 48/08
192/56.31
(Continued)

FOREIGN PATENT DOCUMENTS

CN 101504065 B * 1/2012
CN 104787116 A * 7/2015
(Continued)

OTHER PUBLICATIONS

Iternation Search Report of PCT/CN2019/091975, dated Aug. 23, 2019.

*Primary Examiner* — Ernesto A Suarez
*Assistant Examiner* — James J Taylor, II

(57) ABSTRACT

A differential locking mechanism is disclosed including a differential and a locking mechanism; a rotating shaft is rotatably and symmetrically provided on a shell; a gear A is fixedly provided at one end of the rotating shaft facing outside the shell; a sleeve is fixedly provided at the other end of the shell; a cylindrical gear is rotatably provided on one side of the sleeve close to a half-axle gear; one end of the cylindrical gear having teeth is meshed with the gear A, the other end is fixedly connected with a locking piece B; the locking piece B is rotatably connected to the sleeve; a locking piece C is provided opposite to the locking piece B, completing locking with the locking piece B; a connecting member D is sleeved on the sleeve and rotates together; a shifting fork is movably connected to the locking piece C.

4 Claims, 2 Drawing Sheets

(56) References Cited

U.S. PATENT DOCUMENTS

| | | | | |
|---|---|---|---|---|
| 4,943,269 | A | * | 7/1990 | Smith ............... F16H 48/08 |
| | | | | 475/150 |
| 10,012,301 | B2 | | 7/2018 | Mizukawa |
| 10,385,954 | B2 | * | 8/2019 | Chen ............... B60K 17/3462 |
| 2011/0111913 | A1 | | 5/2011 | Haggerty |
| 2018/0100570 | A1 | * | 4/2018 | Yang ............... F16H 48/22 |
| 2019/0383378 | A1 | | 12/2019 | Surve et al. |

FOREIGN PATENT DOCUMENTS

| | | |
|---|---|---|
| CN | 204512357 U | 7/2015 |
| CN | 205136511 U | 4/2016 |
| CN | 106678327 A | 5/2017 |
| CN | 109027177 A | 12/2018 |
| JP | 06257647 A | 9/1994 |

\* cited by examiner

DIFFERENTIAL LOCKING MECHANISM

CROSS-REFERENCE TO RELATED APPLICATIONS

This application is a continuation of International Patent Application No. PCT/CN2019/091975 with a filing date of Jun. 20, 2019, designating the United States, now pending, and further claims priority to Chinese Patent Application No. 201811022133.3 with a filing date of Sep. 4, 2018. The content of the aforementioned applications, including any intervening amendments thereto, are incorporated herein by reference.

TECHNICAL FIELD

The present disclosure relates to the field of automobile accessories, in particular to a differential locking mechanism.

BACKGROUND ART

At present, the current existing differential locking mechanism has disadvantages of complex structure, high requirements on materials, and difficult to manufacture with expensive. Some have a complicated locking process that can be locked only by stopping or slowing the vehicles. Some have a slow reaction speed, or low structural strength without durability.

In view of the aforementioned disadvantages, the present disclosure relates to differential locking mechanism which is relatively simple in structure and durable, having low requirements for technology and material, and easy to fabricate and assembly, further having easy locking operation and sensitive reaction, and without stopping or reducing the speed of the vehicle the locking operation may be realized. Additionally, the locking operation can be manually initiated or controlled by computers to realize intelligence of the differential locking mechanism.

SUMMARY OF INVENTION

The present disclosure relates to a differential locking mechanism, including:

a differential mechanism and a locking mechanism; the differential mechanism includes a driven gear, a shell, a half shaft, a half-shaft gear, a planetary gear and a rotating shaft; one end of the shell is fixedly provided with the driven gear, and each end of the shell is respectively provided with a half shaft in a rotating way; one end of each of the two half shafts, facing the inside of the shell, is fixedly provided with the half-shaft gear; the rotating shaft is rotationally and symmetrically arranged on the shell; the rotating shaft is rotatably connected with the shell, pointing to an axial line of the shell and is perpendicularly intersected with the axial line of the shell; one end of the rotating shaft, facing inside of the shell, is fixedly provided with a planetary gear; the planetary gear is meshed with two half-shaft gears; and the other end of the rotating shaft, facing outside of the differential case, is fixedly provided with a gear A. The locking mechanism includes a sleeve, a gear A, a cylindrical gear, a locking piece B, a locking piece C, a connecting piece D, a shifting fork and a fixing piece; one end of the shell is fixedly provided with the sleeve, the sleeve is sleeved on the half shaft, and the sleeve is rotatably connected with the half shaft; the cylindrical gear is sleeved on one side of the sleeve which is close to the half-shaft gear, the cylindrical gear is rotatably connected with the sleeve, one toothed end of the cylindrical gear is meshed with the gear A, the other end of the cylindrical gear is fixedly connected with the locking piece B; the locking piece B is sleeved on the sleeve, and the locking piece B is rotatably connected with the sleeve; the locking piece C is positioned to be opposite with the locking piece B and locked by the locking piece B. The connecting piece D is sleeved on the sleeve and combined with the sleeve to rotate together with the sleeve, and the connecting piece D is configured for connecting the locking piece C and the sleeve; the shifting fork is movably connected with the locking piece C, and capable of pushing the locking piece C to be engaged with the locking piece B to complete the locking process; the fixing piece is arranged between the locking piece B and the connecting piece D, and the fixing piece is fixedly connected with the sleeve.

Beneficial Effects

The differential locking mechanism is simple in overall structure, convenient to operate and use, good in stability and high in reliability. The differential locking mechanism is relatively simple in structure and durable, with low requirements on technology and material, easy to fabricate and assembly. The present disclosure further has the advantages of simple locking operation with sensitive reaction which can be locked without stopping or reducing the speed of the vehicle, manually started, and controlled by computers to realize intelligence of the differential locking mechanism.

driven gear; 2. shell; 3. planetary gear; 4. gear A; 5. shaft; 6. cylindrical gear; 7. gear B; 8. shift fork; 9. sleeve; 10. groove; 11. half shaft; 12. coupling sleeve D; 13. fixing member; 14. half-shaft gear 15. ring gear c; 16. gear c; 17. gear d

DESCRIPTION OF EMBODIMENTS

To make the aim, purpose and advantage more understandable, a further description to the present disclosure will be laid out hereinafter.

First Embodiment

Figure 1:
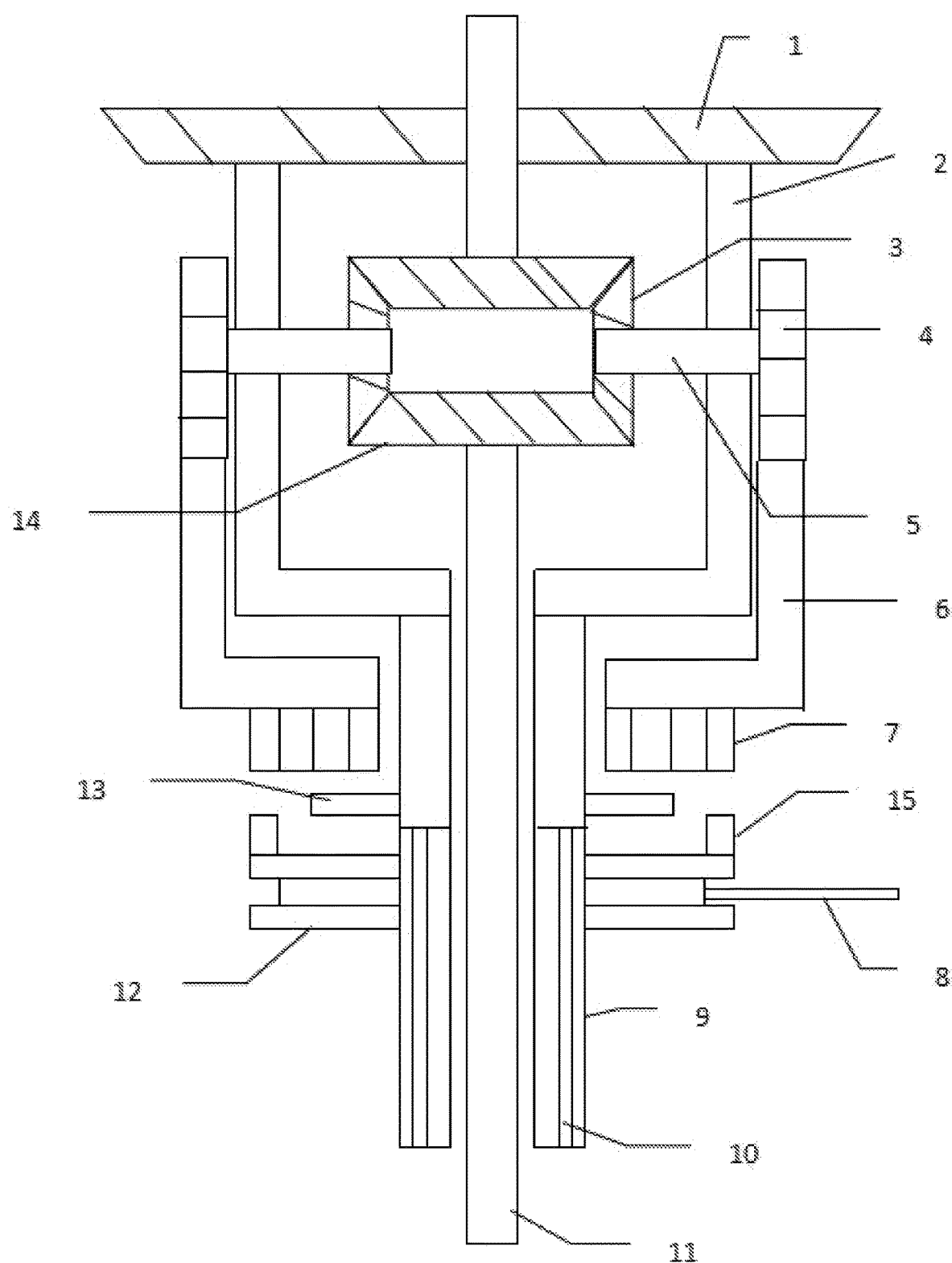
FIG. 1 is a schematic diagram of a differential locking mechanism according to the embodiment one of the present invention.

With reference to FIG. 1, the description taken in conjunction with the embodiments is as follows: a differential locking mechanism includes a differential mechanism and a locking mechanism. The differential mechanism includes a driven gear 1, a shell 2, a half shaft 11, a half-shaft gear 14, a planetary gear 3 and a rotating shaft 5, one end of the shell 2 is fixedly provided with a driven gear 1, the two ends of the shell 2 are respectively provided with the half shafts 11 in a rotating way; one end of each of the two half shafts 11 facing the inside of the shell 2 is fixedly provided with a half-shaft gear 14; the rotating shafts 5 are rotationally and symmetrically arranged on the shell 2; the rotating shaft 5 is rotationally connected with the shell 2, pointing to an axial line of the shell 2 and is perpendicularly intersected with the axial line of the shell 2; one end of the rotating shaft 5, facing the inside of the shell 2, is fixedly provided with a planetary gear 3; the planetary gear 3 is meshed with two half-shaft gears 14; and one end of the rotating shaft 5, facing the outside of the shell 2, is fixedly provided with a gear A4. The above content introduces the basic structure of the existing mature differential mechanism. The locking device includes a sleeve 9, a gear A4, a cylindrical gear 6, a locking gear B7, a locking gear ring C15, a combination sleeve D12, a shifting fork 8 and a fixing piece 13. One end of the shell 2 is fixedly provided with a sleeve 9, the sleeve 9 is sleeved on the half shaft 11, the sleeve 9 is rotatably connected with the half shaft 11. One end of the sleeve 9 far away from the half-shaft gear 14 is provided with a groove 10. The central line of the sleeve 9 is parallel to the central line of the groove 10. A cylindrical gear 6 is sleeved on one side of the sleeve 9 which is close to the half-shaft gear 14. The cylindrical gear 6 is rotatably connected with the sleeve 9, one end of the cylindrical gear 6 has teeth to be meshed with the gear A4, the other end of the cylindrical gear 6 is fixedly connected with a locking gear B7, the locking gear B7 is sleeved on the sleeve 9, and the locking gear B7 is rotatably connected with the sleeve 9. The position of the locking gear ring C15 is opposite to the locking gear B7, and capable of being meshed with the locking gear B7. And the locking gear ring C15 is fixedly connected with one end of the combination sleeve D12. The combination sleeve D12 is sleeved on the sleeve 9, the inner wall of the combination sleeve D12 has teeth for being meshed with the groove 10, the combination sleeve D12 and the sleeve 9 rotate synchronously. The combination sleeve D12 can move longitudinally along the sleeve 9, the outer side of the combination sleeve D12 is provided with an annular groove, the shifting fork 8 is arranged in the annular groove of the combination sleeve D12, and the shifting fork 8 is movably connected with the combination sleeve D12; The fixing piece 13 is arranged between the locking gear B7 and the combining sleeve D12, and is fixedly connected with the sleeve 9.

When the vehicle runs normally, the locking gear B7 and the locking gear ring C15 are in a non-meshed state. The two half-shaft gears 14 rotate synchronously without rotating speed difference, and the planetary gears 3 that is meshed with the two half-shaft gears 14 fails to rotate relatively. In this case, the gear A4 fixedly connected to the planetary gear 3 via the rotating shaft 5 does not rotate with respect to the shell 2. The cylindrical gear 6 meshed with the gear A4 rotates synchronously relative to the sleeve 9, the locking gear B7 fixedly connected with the cylindrical gear 6 also rotates synchronously with the sleeve 9, and the locking gear ring C15 fixedly connected with the combination sleeve D12 rotates synchronously with the sleeve 9. Because the locking gear ring C15 rotates synchronously with the sleeve 9, the locking gear B7 and the locking gear ring C15 rotate synchronously without rotating speed difference.

When a wheel on one side slips, the two half-shaft gears 14 generate rotating speed difference and drive the planetary gear 3 to generate relative rotation. Meanwhile, the planetary gear 3 drives the gear A4 to rotate through the rotating shaft 5. The gear A4 drives the cylindrical gear 6 to rotate, the locking gear B7 fixedly connected with the cylindrical gear 6 also generates rotation, and the locking gear B7 and the locking gear ring C15 generate rotating speed difference. At this time, the shifting fork 8 is started to drive the combination sleeve D12 to move longitudinally to the locking gear B7 so that the locking gear B7 is meshed with the locking gear ring C15 to complete locking process. The locking gear B7 and the locking gear ring C15 can not generate rotating speed difference, the cylindrical gear 6 and the sleeve 9 can not generate relative rotation, the gear A4 and the differential case 2 can not generate relative rotation, the planetary gear 3 can not generate relative rotation, the two half shaft gears 14 can not generate rotating speed difference, and the two half shafts 11 can only synchronously rotate.

Second Embodiment

Figure 2:
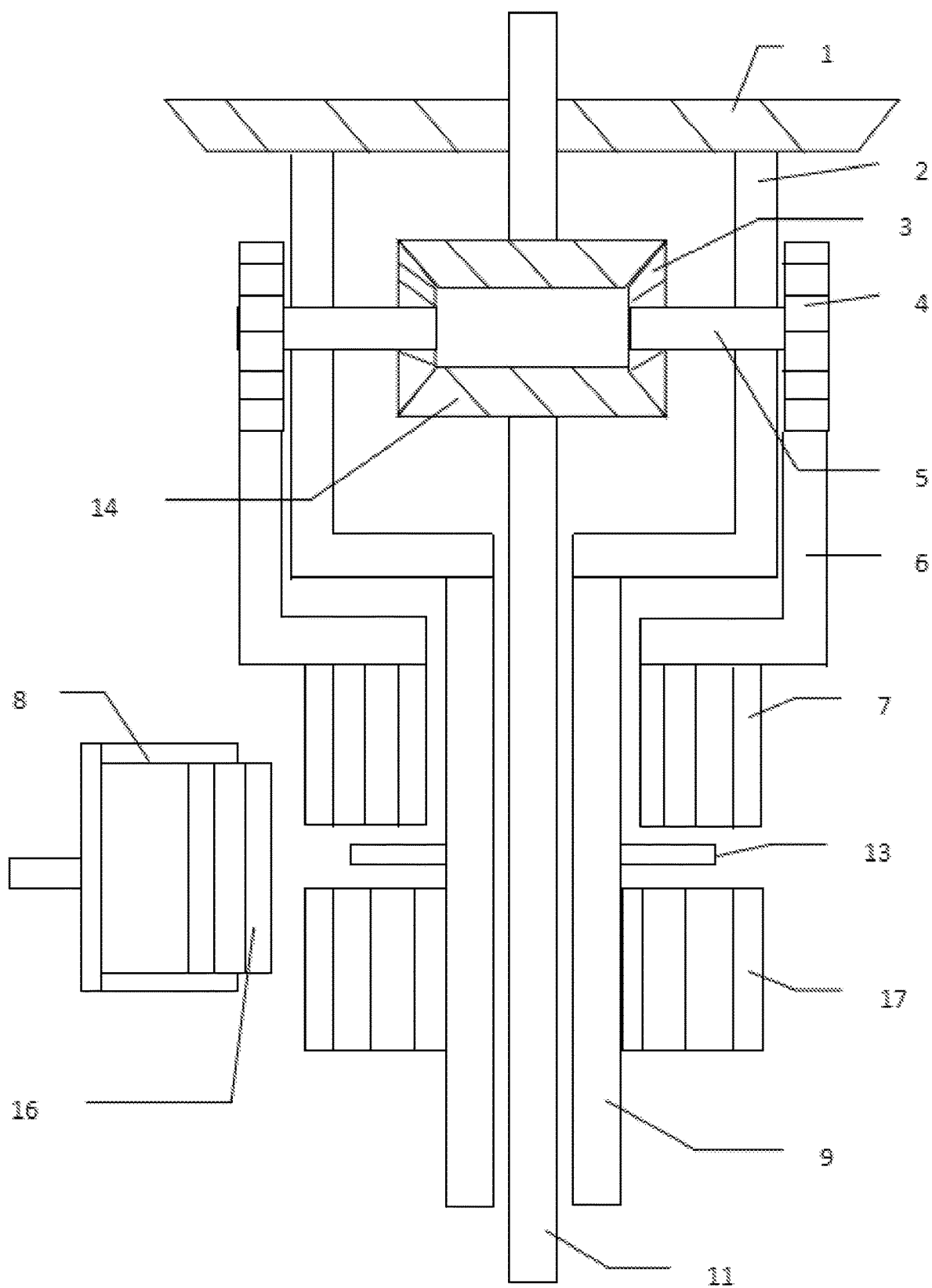
FIG. 2 is a schematic diagram of a differential locking mechanism according to the embodiment two of the present invention.

Referring now to FIG. 2, the description taken in conjunction with the examples is as follows: a differential locking mechanism includes a differential mechanism and a locking mechanism. The differential mechanism includes a driven gear 1, a shell 2, a half shaft 11, a half-shaft gear 14, a planetary gear 3 and a rotating shaft 5, one end of the shell 2 is fixedly provided with a driven gear 1, the two ends of the shell 2 are respectively provided with a half shaft 11 in a rotating way. One end of each of the two half shafts 11 facing inside the shell 2 is fixedly provided with a half-shaft gear 14, the rotating shafts 5 are rotationally and symmetrically arranged on the shell 2. The rotating shaft 5 is rotationally connected with the shell 2, pointing to the axial line of the shell 2 and is perpendicularly intersected with the axial line of the shell 2. One end of the rotating shaft 5, facing inside the shell 2, is fixedly provided with a planetary gear 3; the planetary gear 3 is meshed with two half-shaft gears 14; and one end of the rotating shaft 5, facing outside the shell 2, is fixedly provided with a gear A4. The above content introduces the basic structure of the existing differential mechanism. The locking device includes a sleeve 9, a gear A4, a cylindrical gear 6, a locking gear B7, a gear C16, a gear D17, a shifting fork 8 and a fixing piece 13. One end of the shell 2 is fixedly provided with a sleeve 9, the sleeve 9 is sleeved on the half shaft 11, the sleeve 9 is rotationally connected with the half shaft 11, and one end of the sleeve 9, far away from the half-shaft gear 14 is fixedly provided with a gear D17. A cylindrical gear 6 is sleeved on one side of the sleeve 9 close to the half-shaft gear 14, the cylindrical gear 6 is rotatably connected with the sleeve 9, one end of the cylindrical gear 6 with teeth is meshed with the gear A4, the other end of the cylindrical gear 6 is fixedly connected with a locking gear B7, the locking gear B7 is sleeved on the sleeve 9, and the locking gear B7 is rotatably connected with the sleeve 9. The locking gear B7 has the same radius as the gear D17 and the same number of teeth as the gear D17. The gear C16 is positioned opposite to the locking gear B7, the gear C16 is positioned opposite to the gear D17, and the gear C16 is simultaneously meshed with the locking gear B7 and the gear D17. The shifting fork 8 is movably connected with the gear C16. The fixing piece 13 is arranged between the locking gear B7 and the gear D17, and the fixing piece 13 is fixedly connected with the sleeve 9.

When the vehicle is running normally, the gear C 16 is not engaged with the locking gear B 7 and the gear D 17. The two half-shaft gears 14 rotate synchronously without speed discrepancy, and the planetary gears 3 meshed with the two half-shaft gears 14 do not rotate relatively. At this time, the gear A4 fixedly connected to the planetary gear 3 via the rotating shaft 5 does not rotate with respect to the shell 2, a cylindrical gear 6 meshed with the gear A4 rotates synchronously with respect to the sleeve 9, and a locking gear B7 fixedly connected to the cylindrical gear 6 rotates synchronously with the sleeve 9. Because the gear D17 is fixedly connected with the sleeve 9, the locking gear B7 and the gear D17 rotate synchronously without speed discrepancy.

When a wheel on one side slips, the two half-shaft gears 14 generate a speed discrepancy to drive the planetary gear 3 rotate relatively. Meanwhile, the planetary gear 3 drives the gear A4 to rotate through the rotating shaft 5, the gear A4 drives the cylindrical gear 6 to rotate, the locking gear B7 fixedly connected with the cylindrical gear 6 also starts to rotate; while, the locking gear B7 and the gear D17 generate the speed discrepancy. In this case, the shifting fork 8 is started to drive the gear C16 to move towards the locking gear B7 and the gear D17 so that the gear C16 is simultaneously meshed with the locking gear B7 and the gear D17 to complete the locking operation. The locking gear B7 and the gear D17 may not generate the speed discrepancy, the cylindrical gear 6 and the sleeve 9 may not rotate relatively, thus the gear A4 and the shell 2 may not rotate relatively, the planetary gear 3 may not rotate relatively, the two half-shaft gears 14 may not generate the speed discrepancy, and the two half shafts 11 are only rotating synchronously.

INDUSTRIAL PRACTICABILITY

The differential locking mechanism of the present disclosure is simple in integral structure, convenient to operate and use, good in stability and high in reliability. The differential locking mechanism is relatively simple in structure and durable, have low requirements on technologies and materials, and easy to manufacture and assemble. The locking operation is simple and has sensitive reaction, without stopping the vehicle or slow the vehicle speed the locking operation may be realized. Also, the locking operation can be manually started, or can be controlled by the computer, to realize intelligence of the locking operation.

What is claimed is:

1. A differential locking mechanism, comprising:
    a differential mechanism; and
    a locking mechanism;
    the differential mechanism comprising a driven gear, a shell, two half shafts, two half-shaft gears, two planetary gears and two rotating shafts;
    one end of the shell being fixedly provided with the driven gear, and each end of the shell being respectively provided with a corresponding half shaft in a rotating way; one end of each of the two half shafts, facing the inside of the shell, being fixedly provided with a corresponding halfshaft gear; the two rotating shafts being rotationally and symmetrically arranged on the shell;
    the two rotating shafts being rotatably connected with the shell, pointing to an axial line of the shell and being perpendicularly intersected with the axial line of the shell;
    one end of each of the two rotating shafts, facing inside of the shell, being fixedly provided with a corresponding planetary gear; the two planetary gears being meshed with the two half-shaft gears; and the other end of each of the two rotating shafts, facing outside of the shell, being fixedly provided with a corresponding one of two gears A;
    the locking mechanism comprising a sleeve, the two gears A, a cylindrical gear, a locking piece B, a locking piece C, a connecting piece D, a shifting fork and a fixing piece;
    the shell being fixedly provided with the sleeve; the sleeve being sleeved on one of the two half shafts away from the driven gear, and the sleeve being rotatably connected with the one of the two half shafts; the cylindrical gear being sleeved on one side of the sleeve which is close to the two half-shaft gears, the cylindrical gear being rotatably connected with the sleeve, one toothed end of the cylindrical gear being meshed with the two gears A, an other end of the cylindrical gear being fixedly connected with the locking piece B;
    the locking piece B being sleeved on the sleeve, and the locking piece B being rotatably connected with the sleeve; the locking piece C being positioned to be opposite with the locking piece B and locked by the locking piece B;
    the connecting piece D being sleeved on the sleeve and combined with the sleeve to rotate together with the sleeve, and the connecting piece D being configured for connecting the locking piece C and the sleeve;
    the shifting fork being movably connected with the locking piece C, and capable of pushing the locking piece C to be engaged with the locking piece B to complete a locking process;
    the fixing piece being arranged between the locking piece B and the connecting piece D, and the fixing piece being fixedly connected with the sleeve.

2. The differential locking mechanism of claim 1, wherein, a rotational speed difference between the locking piece B and the sleeve is adjustable by adjusting a number of teeth of a corresponding half-shaft gear, a corresponding planetary gear, a corresponding gear A and the cylindrical gear so as to facilitate combination of the locking piece B and the locking piece C.

3. The differential locking mechanism of claim 1, wherein the locking piece B, the locking piece C and the connecting piece D are defined in different structures that are selected from one of a gear and a friction plate.

4. The differential locking mechanism of claim 1, wherein, triggering the locking process is realized by a diversity of the shifting fork, electromagnetic, pneumatic or inclined surface; an actuation is realized by manual or intelligent control.

* * * * *